United States Patent [19]

Yoshioka

[11] 4,319,478
[45] Mar. 16, 1982

[54] METHOD FOR MANUFACTURING AN INNER JOINT MEMBER OF CONSTANT VELOCITY JOINT

[75] Inventor: Morihisa Yoshioka, Hamamatsu, Japan
[73] Assignee: NTN Toyo Bearing Company, Ltd., Osaka, Japan
[21] Appl. No.: 202,437
[22] PCT Filed: Nov. 29, 1979
[86] PCT No.: PCT/JP79/00304
  § 371 Date: Aug. 2, 1980
  § 102(e) Date: May 23, 1980
[87] PCT Pub. No.: WO80/01145
  PCT Pub. Date: Jun. 12, 1980
[30] Foreign Application Priority Data
  Dec. 2, 1978 [JP] Japan .................. 53-149467
[51] Int. Cl.$^3$ .................................... B21D 72/00
[52] U.S. Cl. ............................. 72/306; 72/302
[58] Field of Search ............ 72/354, 356, 358, 359, 72/360, 371

[56] References Cited

U.S. PATENT DOCUMENTS

| | | | |
|---|---|---|---|
| 2,930,483 | 3/1960 | Karl | 72/377 |
| 3,036,366 | 5/1962 | Ricks | 72/356 X |
| 3,124,876 | 3/1964 | Putelli | 72/354 |
| 3,186,209 | 6/1965 | Friedman | 72/356 |
| 4,048,715 | 3/1978 | Koch et al. | 72/356 |

*Primary Examiner*—Leon Gilden
*Attorney, Agent, or Firm*—Armstrong, Nikaido, Marmelstein & Kubovcik

[57] ABSTRACT

A constant velocity joint adapted to transmit rotary motion from a driving shaft to a driven shaft at the same angular velocity comprises, for example, an outer joint member 10 associated with the driving shaft 1, an inner joint member 20 associated with the driven shaft 2 and a plurality of ball elements 3 interposed between these joint members with a cage member therebetween. The inner member 20 has an outer spherical surface 22, and a plurality of circumferentially distributed ball grooves 21 each having its groove bottom drawing a curved or arcuate line whose curvature center is located at a point B axially apart from the curvature center 0 of the outer spherical surface as viewed in axial section. The inner member is formed through two steps of forming works consisting of a first step for providing the ball grooves and the outer peripheral surface finished to the respective shapes as desired with respect to substantially a half $l_1$, and a second step for providing the ball grooves and the outer periphery finished to the desired shape with respect to the other half $l_2$.

4 Claims, 11 Drawing Figures

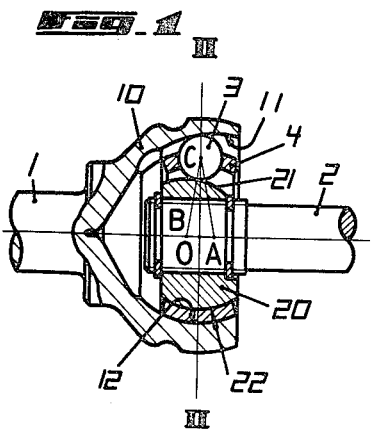
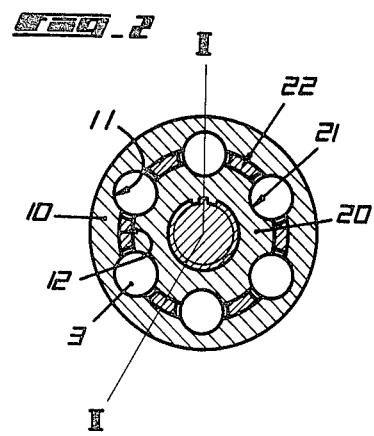
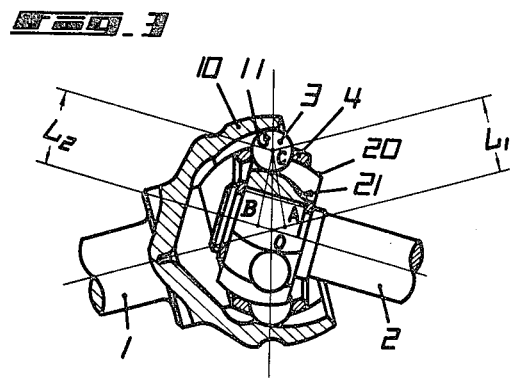
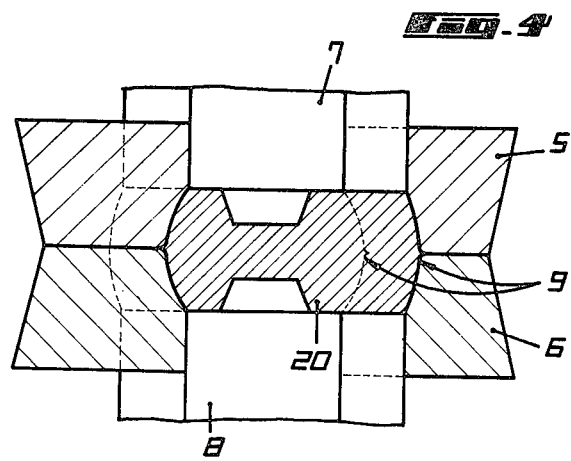

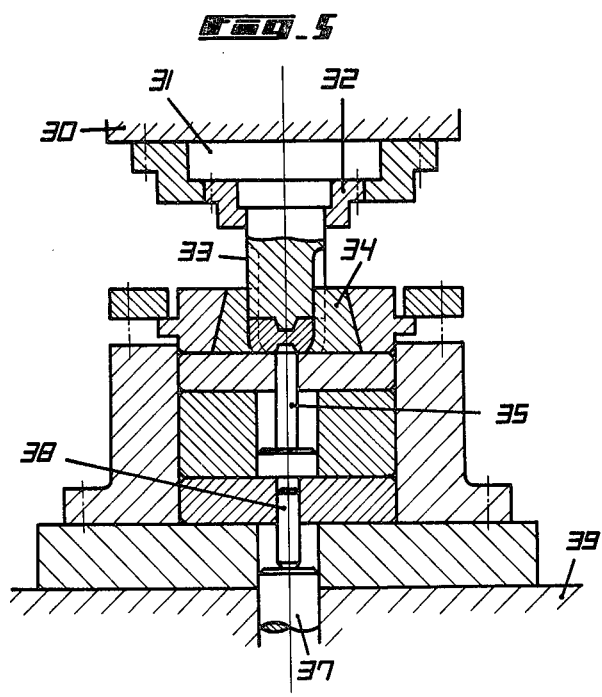
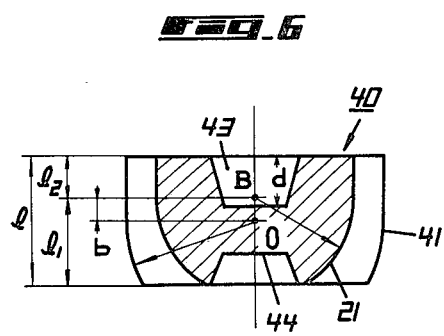

METHOD FOR MANUFACTURING AN INNER JOINT MEMBER OF CONSTANT VELOCITY JOINT

The present invention relates to a constant velocity joint for transmitting rotary motion from a driving shaft to a driven shaft at the same angular velocity. In particular, the invention is concerned with a method for manufacturing inner joint members of such constant velocity joint. The inner joint member has an outer spherical surface and is provided at circumferentially distributed positions in the peripheral surface with ball grooves each having arcuate groove bottom as viewed in axial section with the curvature center of the arcuate groove bottom being axially apart from the curvature center of the outer spherical surface of the inner joint member.

Generally speaking, in the constant velocity joint of the type wherein balls 3 are used as intermediary for torque transmission between driving shaft 1 and driven shaft 2 as shown in FIGS. 1 to 3, the balls 3 are to be at all times positioned in a plane bisecting the angle formed between the driving shaft 1 and the driven shaft 2 for maintaining the same angular velocity between these two shafts. It is well-known that to meet such a condition, the curvature center A of ball grooves 11 in the outer member 10 on the driving shaft 1 and the curvature center B of ball grooves 21 in the inner member 20 on the driven shaft 2 are to be on the opposite sides of and spaced by a same distance from the joint center O. In this occasion, a locus of the center C of the ball which rolls in the ball groove draws a curve whose centers of curvature lie on the points A and B. The center O also serves as the curvature center of the inner spherical surface 12 of the outer member 10, the outer spherical surface 22 of the inner member 20 and the inner and outer spherical surfaces of cage 4 disposed between the opposed spherical surfaces 12, 22. Therefore, the inner and outer members 10, 20 can get disaligned with each other about the center O with the cage 4 therebetween. In other words, the joint center O is at all times set at a fixed position by the cage 4.

This setting of the curvature centers A, B of the ball grooves 11 in the outer member 10 and the ball grooves 21 in the inner member 20 maintains equality between the distances (offset) from the center O of joint to the points A and B respectively and between the distances from the center C of the ball to the points A and B respectively. Therefore, $\triangle OAC$ is congruent with $\triangle OBC$ because of equal lengths of the respective three sides, leading to equality in distances $L_1$ and $L_2$ from the center C of the ball to the axes of the both shafts respectively. As a result, the balls 3 are always controlled to be in a plane bisecting an angle formed between the shafts 1 and 2. This is also applicable to the other balls such as those which are not in the plane of the drawing sheet on which FIG. 3 appears. In this matter, the constant velocity on the both shafts can be assured even when disaligned in this type of constant velocity joint.

The aforedescribed special design applied to the inner and outer joint members of this kind of constant velocity joint naturally results in extra machining hours as well as in a reduction in the yield rate of material if they are manufactured by milling work or the like only, and it has been previously indispensable to adopt a special machining process.

Conventionally used for the manufacture of the inner joint member 20 is, for example, a pair of mating split mold-halves 5, 6 as shown in FIG. 4; which allows to simultaneously form peripheral surface 22 and ball grooves 21 through one forming action, thus saving working hours. However, technical requirements for the removal of the upper mold-half 5 prior to discharging a formed inner member 20 with the bottom mold-half 6 fixed as well as for effecting simultaneous motions of the upper and lower punches 7, 8 for forming operation require a pressing machine equipped with at least three sliding mechanisms, which is costly and complicated in construction. In addition, such split-mold frequently and inherently used to accompany inaccurate setting of the mold halves 5, 6, which adversely affects on dimensional accuracy of the products and fins 9 produced between the mating surfaces of the mold halves cause the subsequent processes to be bothersome.

In view of the conventional disadvantages as described above, the present invention has its object in the eliminating of such disadvantages to provide a simple yet effective method for manufacturing the inner joint members consisting of two forming steps.

To this end, the present invention provides a method for manufacturing an inner joint member of constant velocity joint having an outer spherical surface and being provided at circumferentially distributed positions in the peripheral surface with ball grooves each having arcuate or curved groove bottom as viewed in axial section with the curvature center of the arcuate groove bottom being axially apart from the curvature center of the peripheral surface of the inner joint member. The method consists of the steps of first plastic working a stock for the inner joint member using a first forming set for providing the peripheral surface and the ball grooves shaped as arcs in axial section with the curvature centers thereof respectively located at predetermined points, with respect to substantially a half of the length of the inner member, while with respect to substantially the other half, the stock is shaped for providing the peripheral surface and the ball grooves in the form of straight lines respectively connecting with the aforementioned arcs and parallel to the longitudinal axis, and thereafter plastic working the half-shaped stock using a second forming set for finishing the portions of the ball grooves shaped in the first step as straight lines to arcs with the curvature center thereof located at the aforesaid predetermined point. The first forming set comprises a die having a predetermined contour to which the stock for the inner member is to be conformed, a punch cooperating therewith and a counter punch. The punch and the counter punch are so designed that in the first working step, axially extending recesses are formed at the central locations in both the end surfaces of the stock, one of which recesses on the straight-shaped portion side being equal to or greater in depth than the axial length of the straight-shaped portion. According to the present invention, therefore, it is possible to obtain through the two steps of forming works the inner joint member for constant velocity joint with the sophisticated configuration, thus resulting in advantages of simplified operation and easier subsequent process, if any, much attributable to higher precision of the product comparing to the products by the conventional methods.

These and other objects and features of the present invention will become more apparent from the following description when read in conjunction with the accompanying drawings, in which:

FIG. 1 is a section taken along the line I—I of FIG. 2 and showing the fundamental construction of a constant velocity joint;

FIG. 2 is a section taken along the line II—II of FIG. 1;

FIG. 3 is a section similar to FIG. 1 with the two shafts disaligned;

FIG. 4 is a schematic drawing showing one of the conventional methods of producing inner joint members;

FIG. 5 is a sectional elevation of a forming die set for use in the first step of the method according to the present invention and showing a state at the end of the first step;

FIG. 6 is an axial section of a half-shaped stock obtained by the first step of the inventive method;

Figure 7:
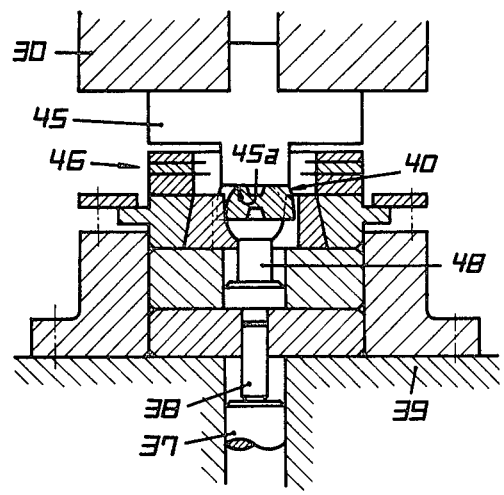
FIG. 7 is a sectional elevation of a forming die set for use in the second step of the inventive method showing a state at the beginning of the second step.

The inventive method for manufacturing the inner joint members of constant velocity joint will now be described in detail with reference to the accompanying drawings illustrating preferred embodiments of the invention solely for example.

Referring to FIG. 5 showing a forming die set for use in the first step of the method of the invention, the numeral 30 designates a press slide; 31, a punch pressure plate; 32, a punch holder; 33, a punch; 34, a die; and 35 designates a counter punch. It should be noted that the method of forming is not limited to cold forming as is practiced herein.

Firstly, after a stock for the inner joint member is placed in position in the die 34, the press slide 30 is lowered so as to press the stock between the punch 33 and the counter punch 35 thereby deforming it in conformity with the interior shape of the die 34. A resulting article thus pressed is discharged by means of a knockout bar 37 and a knockout pin 38. Designated by the numeral 39 is a press bed. As is apparent from FIG. 6 illustrating the article 40 thus obtained by the first step according to the invention, on one hand with respect to substantially a half (i.e. the lower half in the illustrated embodiment) ranging from the center or median O (also serving as the center of joint) of the length l to one end thereof, the stock is provided the outer peripheral surface 41 shaped as a discontinuous spherical surface having the point O as its curvature center or, in other words, as arcs in axial section having the point O as the curvature center. On the other, with respect to the other half (i.e. the upper half in case of the illustrated embodiment), the same is shaped cylindrically or, in other words, as straight lines in axial section respectively connecting with the aforesaid arcs and parallel to the longitudinal axis. Also the ball grooves 21 are shaped as arcs having the point B as the curvature center as viewed in axial section with respect to a half $l_1$ ranging from one end of the article 40 to the point B axially spaced by b from the center O. Whilst, with respect to the other half $l_2$ ranging from the point B to the opposite end, the same are shaped as straight lines connecting with the aforementioned arcs and parallel to the longitudinal axis. The length $l_1$ of the arcuate-shaped portions of the ball grooves is made greater than that $l_2$ of the straight-shaped portions in the first step and, in brief, is obtained by a formula $l_1=l/2+b$. The end surfaces of the article 40 are simultaneously formed with axial recesses 43 and 44 by means of the punch 33 and the counter punch 35 respectively. In consideration of an influence which may be exerted during the subsequent second step against the arcuate-shaped portions $l_1$ of the ball grooves 21 formed in the first step, the depth d of the recess 43 situated on the straight-shaped-portion side is equal to or greater than $l_2$ so that the second step may be carried out with a lesser extent of loading. Reference will be made later on the significance of this feature.

Figure 8:
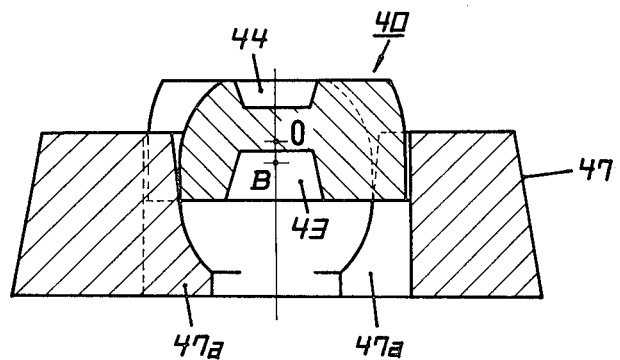
FIG. 8 is an enlarged view in part of the die set shown in FIG. 7.
Figure 11:
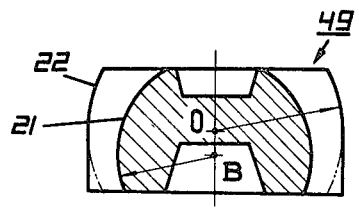
FIG. 11 is an axial section of a finished product obtained by the second step of the inventive method.

In the second step, with the half-shaped article 40 delivered from the first step upside down in position, the straight-shaped portions $l_2$ of the ball grooves 21 are finished to arcs using the forming die set shown in FIG. 7. The numeral 45 designates a punch having a flat surface 45a to abut against an end surface of the article 40; 46, a suitable number of rings for maintaining the stroke-end distance between the punch 45 and the die 47 constant; and 48 designates an ejector. As the article 40 delivered from the first step is mounted and pressed in position in the die 47 in the manner an mentioned above with respect to the first step, the ball grooves 21 formed in the first step is guided by the correspondingly shaped projections 47a (see FIG. 8) of the die 47 for the circumferential positioning. If the ball grooves are not properly set relative to the die 47, the article 40 is slided along the flat surface 45a of the punch 45 for orientation of the ball grooves relative to the corresponding projections. Thus, the formation of the half-shaped article 40 delivered from the first step to such shape as shown in FIG. 11 is accomplished. In the second step, however, there can be a slight danger of adversely influencing on the dimensional accuracy of the product if excessively loaded, because the arcuate-shaped-portion side of the article 40 so shaped in the first step is not clamped by any means. For eliminating such a danger, it is desirable that the proportion of the arcuate-shaped-portion $l_1$ to the straight-shaped-portion $l_2$ is selected as $l_1>l_2$ so that the straight-shaped-portion $l_2$ to be deformed in the second step is as less as possible, thus keeping minimum the amount of stock to be deformed and accordingly the pressing force required in the second step. Furthermore, it is also desirable in this context that the depth d of the axial recess 43 in the straight-shaped-portion $l_2$ is equal to or longer than the straight-shaped-portion $l_2$ as referred to above so that a portion of the stock in the straight-shaped-portion $l_2$ will be facilitated to move aside toward the recess 43 by exerting a lesser extent of loading during the forming process of the second step. The outer peripheral surface is not subjected to drawing and is left intact.

Figure 9:
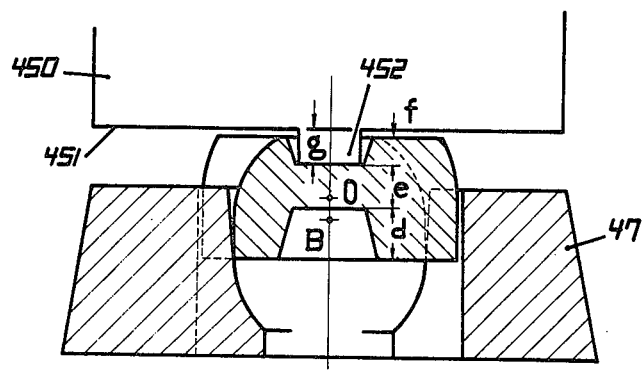
FIG. 9 is a drawing similar to FIG. 8 and showing an embodiment wherein a punch is shown as having a projection at the end surface.
Figure 10:
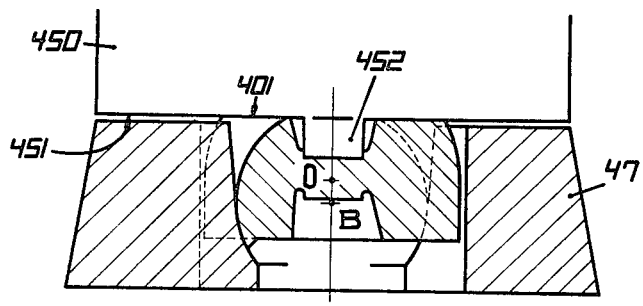
FIG. 10 is a drawing similar to FIG. 9 and showing a state at the end of the second step of the inventive method.

If the abovedescribed measures could not satisfactorily work on preventing a decline in accuracy of the portion $l_1$, the bottom end 451 of punch 450 may be preferably provided a projection 452 protruding thereon as shown in FIG. 9 so that the portion designated at e of the article may be loaded simultaneously. The protruding height g of the projection is set to be represented as $g=f+(0.05 \sim 0.5)e$. Therefore, at the end of the second step, the portion e is in a state as if being under a boring operation by the projection 452 of the punch, while the end surface 401 of the article is in a state of being pressed down beneath the end surface 451 of the punch 450 as shown in FIG. 10. Since the pressing force is thus divided into two forces; one for pressing down the end surface of the article and another for boring the portion e of the same, the latter force being adjustable by changing the distance e of the central portion of the article and the height g of the projection 452 of the punch, it becomes possible not only to eliminate the danger of decline of precision about the portion $l_1$ of the finished article, but also to keep constant the clearance between the end surface 401 of the article and the center of the die groove which is an essential requirement to the second step.

The finished article thus obtained and shown in FIG. 11 is available as a completed product (just as the inner joint member 20 as shown in FIGS. 1 to 3) by simply removing the portion indicated by chain lines and providing a predetermined hole for receiving a rotary shaft. This inner joint member will no more suffer from the lowering of an accuracy of the ball grooves which has been an objectionable problem owing, for example, to the inaccurate setting of the conventional split-type mold. Furthermore, since no fins are produced, there occurs no difficulties therefor in any subsequent processes.

What is claimed is:

1. A method for manufacturing an inner joint member of constant velocity joint having an outer spherical surface and provided at circumferentially distributed positions in the outer spherical surface with ball grooves each having arcuate groove bottom as viewed in axial section with the curvature center of the arcuate groove bottom being axially apart from the curvature center of the outer spherical surface, characterized in consisting of the steps of first plastic working a stock for the inner joint member on a first forming set so as to provide an outer periphery and ball grooves shaped as arcs whose curvature centers are respectively located at predetermined points as viewed in axial section with respect to substantially a half of the length of the inner joint member, said outer periphery and said ball grooves being shaped as straight lines respectively connecting with the arcs and parallel to the longitudinal axis of the inner joint member with respect to substantially the other half, said first forming set comprising a die having a predetermined contour to which the stock for the inner joint member is to be conformed, a punch cooperating therewith and a counter punch, said punch and said counter punch being so designed that in the first plastic working step, axially extending recesses are formed at the central portions in the both end surfaces of the half-shaped article obtained by the first step, one of which recesses on the straight-shaped-portion side of the article being equal to or greater in depth than the length of the straight-shaped-portion, and thereafter plastic working the half-shaped article on a second forming set comprising a die having a predetermined contour to which the article obtained by the first step is to be conformed and a cooperating punch so as to shape the straight-shaped portions of said ball grooves as arcs whose curvature center is positioned at the said predetermined point as viewed in axial section.

2. A method as set forth in claim 1, characterized in that the side of the stock that is shaped in the first step as arcs in axial section is the side in which the ball grooves run deeper than that in the other side.

3. A method as set forth in claim 1, characterized in that the punch of the second forming set has a flat end surface.

4. A method as set forth in claim 1, characterized in that the end surface of the punch of the second forming set is formed with a projection the protruding height of which is greater than the depth of the recess in the end surface on the side arcuate-shaped in the first step.

* * * * *